United States Patent
Momoki

(10) Patent No.: US 12,338,103 B2
(45) Date of Patent: Jun. 24, 2025

(54) ACTIVE GUIDE ROLLER AND ELEVATOR DEVICE

(71) Applicant: Mitsubishi Electric Corporation, Tokyo (JP)

(72) Inventor: Shimpei Momoki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 1329 days.

(21) Appl. No.: 16/978,195

(22) PCT Filed: Apr. 12, 2018

(86) PCT No.: PCT/JP2018/015380
§ 371 (c)(1),
(2) Date: Sep. 4, 2020

(87) PCT Pub. No.: WO2019/198197
PCT Pub. Date: Oct. 17, 2019

(65) Prior Publication Data
US 2021/0039921 A1 Feb. 11, 2021

(51) Int. Cl.
*B66B 7/04* (2006.01)
*B66B 11/02* (2006.01)

(52) U.S. Cl.
CPC .......... *B66B 7/046* (2013.01); *B66B 11/0226* (2013.01); *B66B 11/0206* (2013.01)

(58) Field of Classification Search
CPC ............................ B66B 7/046; B66B 11/0226
USPC ........................................................ 187/393
See application file for complete search history.

(56) References Cited

U.S. PATENT DOCUMENTS

| | | | | |
|---|---|---|---|---|
| 5,929,399 A | * | 7/1999 | Jamieson | B66B 11/028 187/292 |
| 6,474,449 B1 | * | 11/2002 | Utsunomiya | B66B 7/042 187/292 |
| 2009/0308697 A1 | * | 12/2009 | Boschin | B66B 5/0018 187/409 |

(Continued)

FOREIGN PATENT DOCUMENTS

| | | |
|---|---|---|
| JP | 10-174410 A | 6/1998 |
| JP | 2002-289429 A | 10/2002 |

(Continued)

OTHER PUBLICATIONS

International Search Report and Written Opinion mailed on Jun. 26, 2018 for PCT/JP2018/015380 filed on Apr. 12, 2018, 9 pages including English Translation of the International Search Report.

*Primary Examiner* — Erick D Glass
(74) *Attorney, Agent, or Firm* — XSENSUS LLP

(57) ABSTRACT

In an active guide roller and an elevator device according to the present invention, one of an actuator movable portion and an actuator fixed portion includes: a yoke, and a pair of magnets, which are configured to generate a magnetic field intersecting a pivot plane of the guide lever, and another one of the actuator movable portion and the actuator fixed portion includes: a bobbin; and a coil. Contact between the coil and the magnet is avoidable by allowing the bobbin and the magnet to be brought into contact with each other or allowing the bobbin and the yoke to be brought into contact with each other when the actuator movable portion is displaced in a direction perpendicular to the pivot plane.

6 Claims, 9 Drawing Sheets

(56) References Cited

U.S. PATENT DOCUMENTS

2012/0103731 A1    5/2012  Sakuma
2013/0200966 A1    8/2013  Michaelsen et al.

FOREIGN PATENT DOCUMENTS

| JP | 2004-072853 A | 3/2004 |
| JP | 4161063 B2 | 10/2008 |
| JP | 2017-005997 A | 1/2017 |
| WO | 2011/021288 A1 | 2/2011 |

* cited by examiner

ACTIVE GUIDE ROLLER AND ELEVATOR DEVICE

CROSS-REFERENCE TO RELATED APPLICATIONS

The present application is based on PCT filing PCT/JP2018/015380, filed Apr. 12, 2018, the entire contents of which are incorporated herein by reference.

TECHNICAL FIELD

The present invention relates to an active guide roller and an elevator device, which are configured to suppress shaking of a car.

BACKGROUND ART

In an elevator device, guide portions of active guide rollers provided to a car are brought into contact with guide rails installed in a hoistway so as to extend in an up-and-down direction, thereby allowing the car to go up and down along the guide rails. The guide rails have, for example, a step or a bend caused by an error given at the time of installation, the weight of the car, or a change over years. As a result, at the time of going up and down, the car is influenced by displacement disturbance caused by, for example, the step or the bend of the guide rails, which causes a vertical vibration being a vibration in the direction of going up and down and a transverse vibration being a vibration in a direction perpendicular to the direction of going up and down, giving a feeling of discomfort to a passenger.

Hitherto, in order to alleviate displacement input of the vertical vibration and the transverse vibration which occur in the car, there has been taken a measure of installing, for example, an elastic support member or a vibration-proof member between, for example, the cage and a car frame and between the car frame and the guide portions. However, it has become more difficult to deal with an increase in vibration level along with an increase in speed of an elevator by such a passive vibration reduction method of alleviating the displacement input that occurs in the car with the use of, for example, the elastic support member or the vibration-proof member.

In view of such a circumstance described above, there has been proposed an active vibration reduction method of externally applying a force of suppressing vibration to a car. For example, a vibration reduction device described in Patent Literature 1 includes: a guide lever mounted to a car so as to be pivotable; a roller, which is mounted to the guide lever, and is to be brought into contact with the guide rail; a bobbin, which is fixed to the guide lever, and is configured to move in association with pivoting of the guide lever; a coil wound around the bobbin; a yoke fixed to the car; and a pair of magnets which are arranged apart from each other on the yoke so as to be opposed to each other.

The pair of magnets are arranged so as to generate a magnetic field in a direction perpendicular to a pivot plane of the guide lever. The coil is arranged such that a center axis thereof is directed in a direction perpendicular to the magnetic field of the magnets. Here, in an actuator including a yoke, magnets, and a coil, when the coil is energized, a Lorenz force is generated in the coil by magnetic fluxes of the magnets. With this, the guide lever pivots so as to press the roller against the guide rail, and a reaction force generated thereby acts on the car. When a sensor detects the displacement input generated in the car, the coil is energized so as to generate a reaction force in a direction opposite to that of the displacement input generated in the car, thereby reducing the vibration of the car.

CITATION LIST

Patent Literature

[PTL 1] JP 4161063 B2

SUMMARY OF INVENTION

Technical Problem

In the vibration reduction device described in Patent Literature 1, the coil is arranged so as to surround the yoke member arranged between the pair of magnets, to thereby prevent contact between the coil and the yoke member.

However, when an unintended large external force is generated due to, for example, sudden shaking of the car or an unintended collision inside the car, movement of an internal gap portion of a bearing, which is configured to support the guide lever so as to allow the guide lever to pivot, occurs. There has been a problem in that the movement of the internal gap portion of the bearing causes the coil to be brought into contact with the magnet, which results in breakage of the coil.

Moreover, when the gap between the coil and the magnet is set to be large, the contact between the coil and the magnet is avoidable even in a case in which such an unintended large external force is generated. However, setting the gap between the coil and the magnet to be large results in reduction of the Lorenz force, that is, a thrust force of the actuator. In order to compensate for the reduction of the thrust force, it is required to set the size of the actuator to be large. As a result, downsizing of the device cannot be achieved.

The present invention has been made to solve the problem described above, and has an object to obtain a small active guide roller and an elevator device, which are capable of suppressing shaking of a car and reliably preventing breakage of a coil even when an excessive external force acts on a car.

Solution to Problem

According to the present invention, there is provided an active guide roller, including: a guide lever, which is provided to a car provided in a hoistway and configured to go up and down along a guide rail extending in an up-and-down direction, and is provided so as to be pivotable about a first shaft orthogonal to the up-and-down direction; a guide roller provided to the guide lever so as to be turnable about a second shaft parallel to the first shaft; a spring member configured to urge the guide roller into contact with the guide rail; and an actuator including: an actuator fixed portion to be fixed to the car; and an actuator movable portion configured to be driven by pivoting of the guide lever. One of the actuator movable portion and the actuator fixed portion includes: a yoke, which includes a middle leg portion and a pair of side leg portions arranged so as to be opposed to each other across the middle leg portion, and forms a closed magnetic circuit; and a pair of magnets, which are provided on respective surfaces of the pair of side leg portions opposed to the middle leg portion, and are configured to generate a magnetic field intersecting a pivot plane of the guide lever orthogonal to the first shaft, wherein another one of the actuator movable portion and the actuator fixed portion includes: a bobbin including a winding barrel portion into which the middle leg portion is inserted; and a coil, which is wound around the winding barrel portion, and is arranged within the magnetic field, wherein the active guide roller is configured to suppress vibration of the car with use of a Lorenz force generated by application of a current through the coil. The actuator is configured to avoid contact between the coil and the magnet by allowing the bobbin and the magnet to be brought into contact with each other or allowing the bobbin and the yoke to be brought into contact with each other when the actuator movable portion is displaced in a direction perpendicular to the pivot plane.

Advantageous Effects of Invention

According to the present invention, the shaking of the car can be suppressed with use of the Lorenz force generated by application of a current through the coil. Even when an excessive external force acts, prior to the contact between the magnet and the coil, the bobbin and the magnet are brought into contact with each other, or the bobbin and the middle leg portion are brought into contact with each other, thereby being capable of reliably preventing breakage of the coil without setting the gap between the coil and the magnet to be large.

DESCRIPTION OF EMBODIMENTS

First Embodiment

Figure 1:
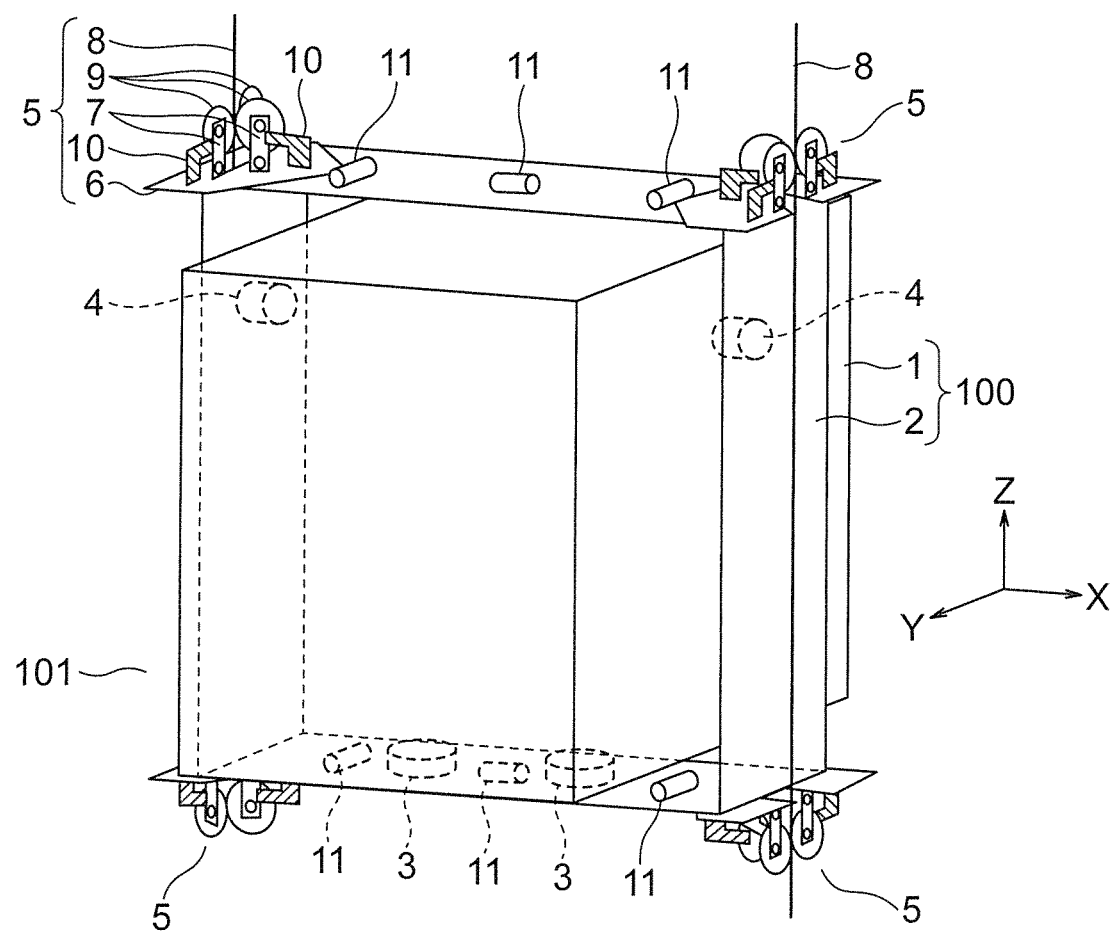
FIG. 1 is a schematic view for illustrating a car, and its surroundings, of an elevator device according to a first embodiment of the present invention.

FIG. 1 is a schematic view for illustrating a car, and its surroundings, of an elevator device according to a first embodiment of the present invention. For convenience, a width direction of a doorway of a cage is referred to as "X direction", a depth direction which is a direction perpendicular to the width direction of the cage in a horizontal plane is referred to as "Y direction", and an up-and-down direction of a hoistway is referred to as "Z direction".

In FIG. 1, a car 100 includes a cage 1 and a car frame 2. The car frame 2 is configured to elastically support the cage 1 through intermediation of, for example, vibration-proof rubbers 3 and vibration stopper rubbers 4. Active guide rollers 5 each include a support base 6, a guide lever 7, a guide roller 9, and an actuator 10. The support base 6 is fixed to the car frame 2. The guide lever 7 is mounted to the support base 6 so as to be pivotable. The guide roller 9 is provided to the guide lever 7, and is brought into contact with a guide rail 8 provided so as to extend in the up-and-down direction in a hoistway 101. The actuator 10 is configured to drive and actively control the guide lever 7 to adjust a state of contact between the guide rail 8 and the guide roller 9. The active guide rollers 5 are mounted on each of both end sides of an upper frame and a lower frame of the car frame 2, which extend in the X direction. Further, on each of end portion sides of the upper frame and the lower frame of the car frame 2, three active guide rollers 5 are provided such that respective guide rollers 9 are brought into contact with a head portion of the guide rail 8 from three directions, that is, from the X direction and from both sides in the Y direction.

Two sensors 11 are provided apart from each other in the X direction on each of the upper frame and the lower frame of the car frame 2. The sensors 11 are each an acceleration sensor configured to detect a state of vibration of the car frame 2 in the X direction and the Y direction by detecting an acceleration of the car frame 2 in the X direction and the Y direction. Here, the sensor 11 is configured to detect the state of vibration of the car frame 2 in the X direction and the Y direction. However, it is only required that the sensor 11 be capable of detecting a state of vibration of the car frame 2 in two different directions in an X-Y plane.

Figure 2:
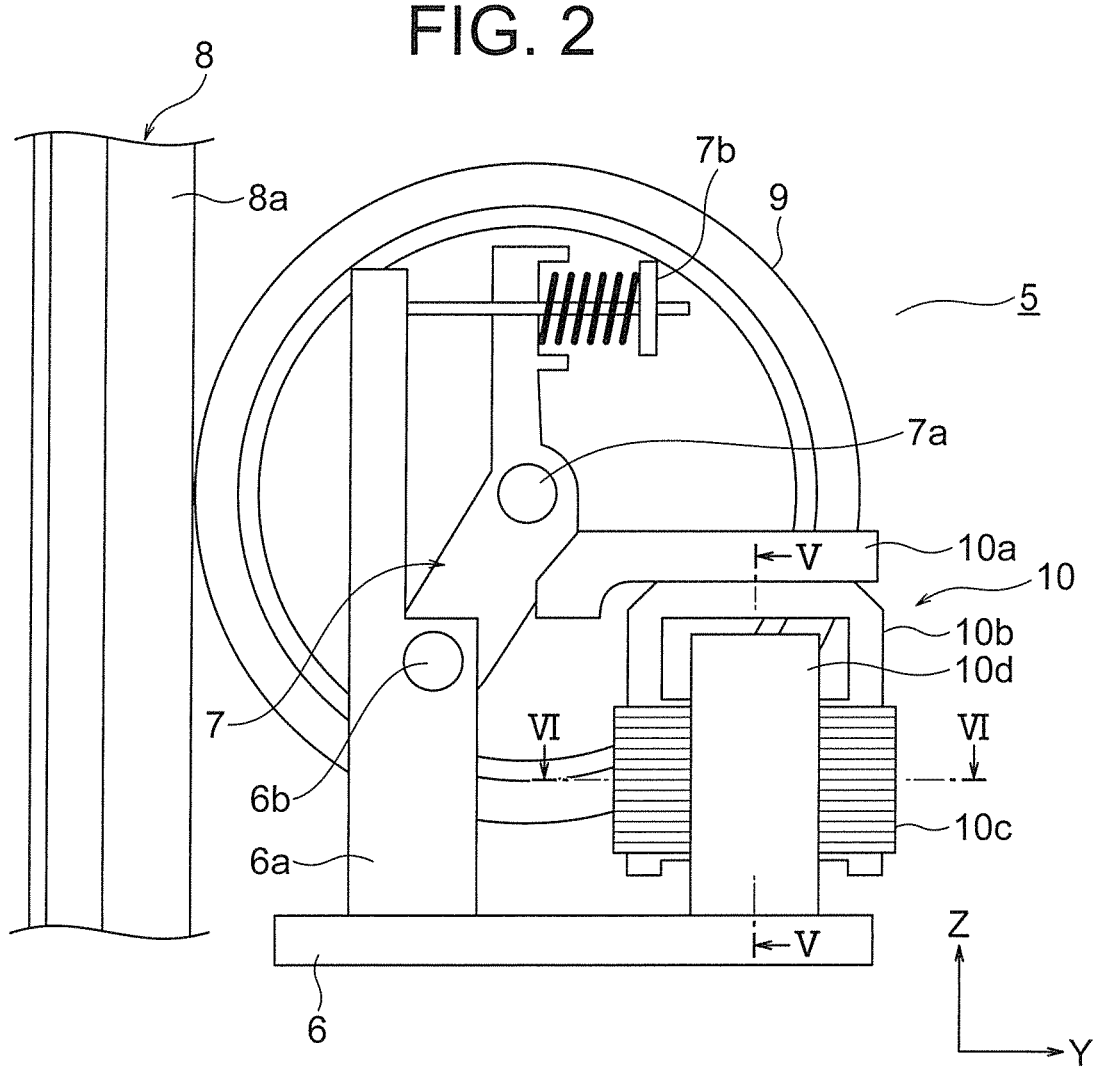
FIG. 2 is a view for illustrating an active guide roller according to the first embodiment of the present invention as seen from a Y direction.
Figure 3:
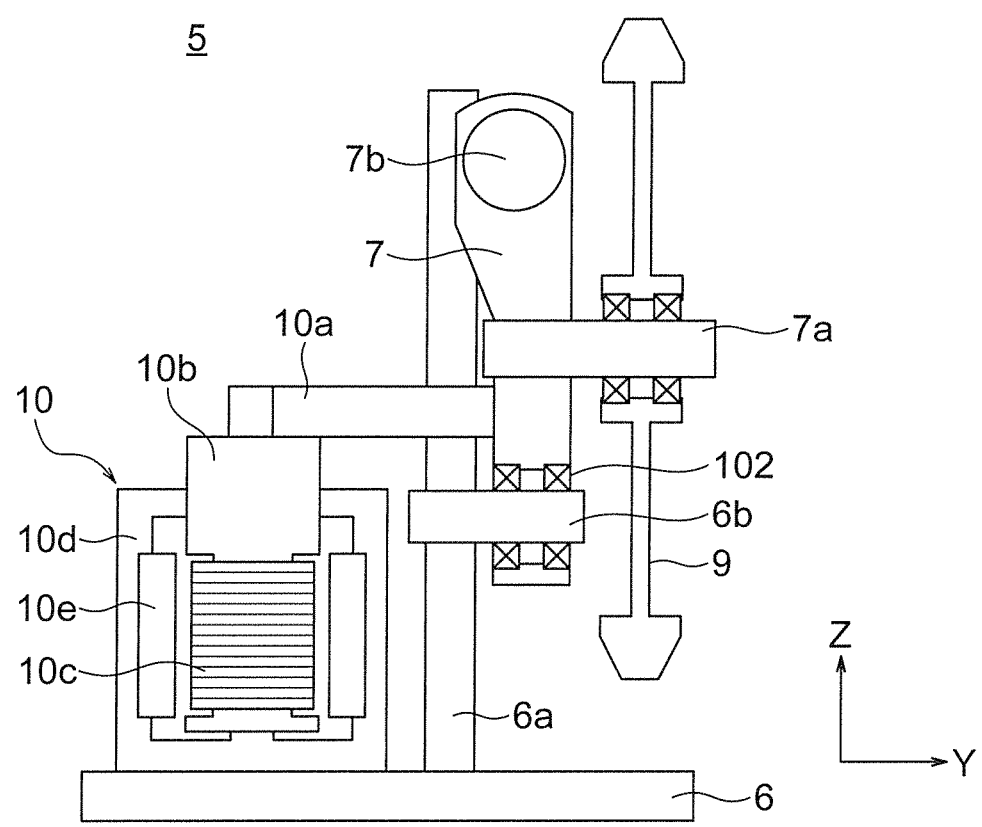
FIG. 3 is a partial sectional view for illustrating the active guide roller according to the first embodiment of the present invention as seen from an X direction.
Figure 4:
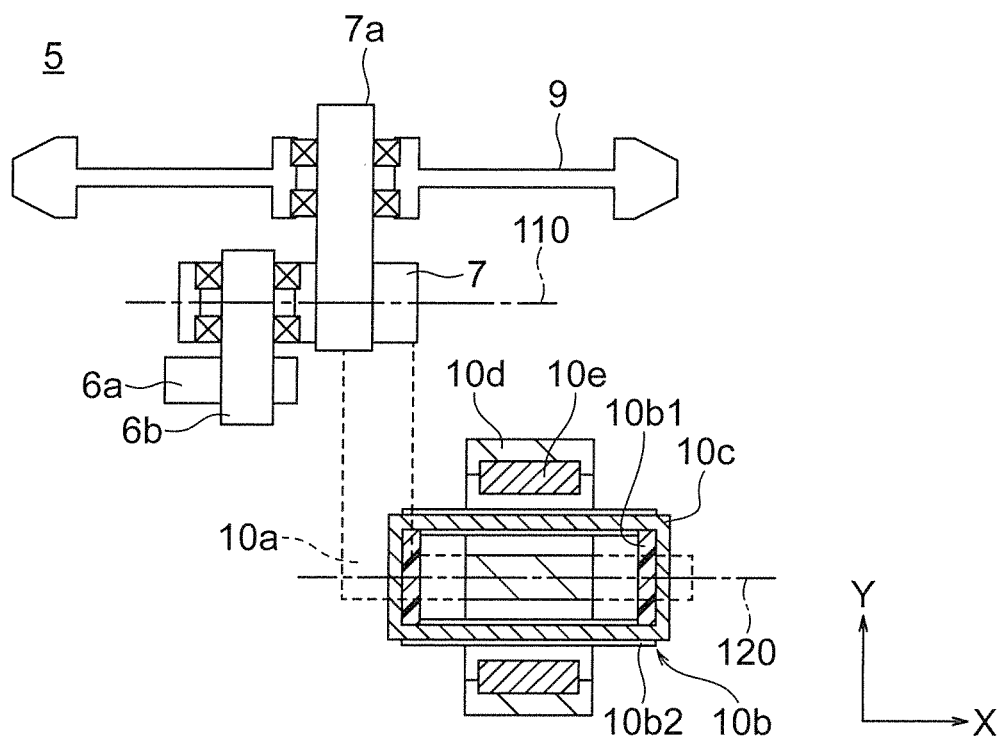
FIG. 4 is an explanatory sectional view for illustrating a configuration of the active guide roller according to the first embodiment of the present invention.
Figure 5:
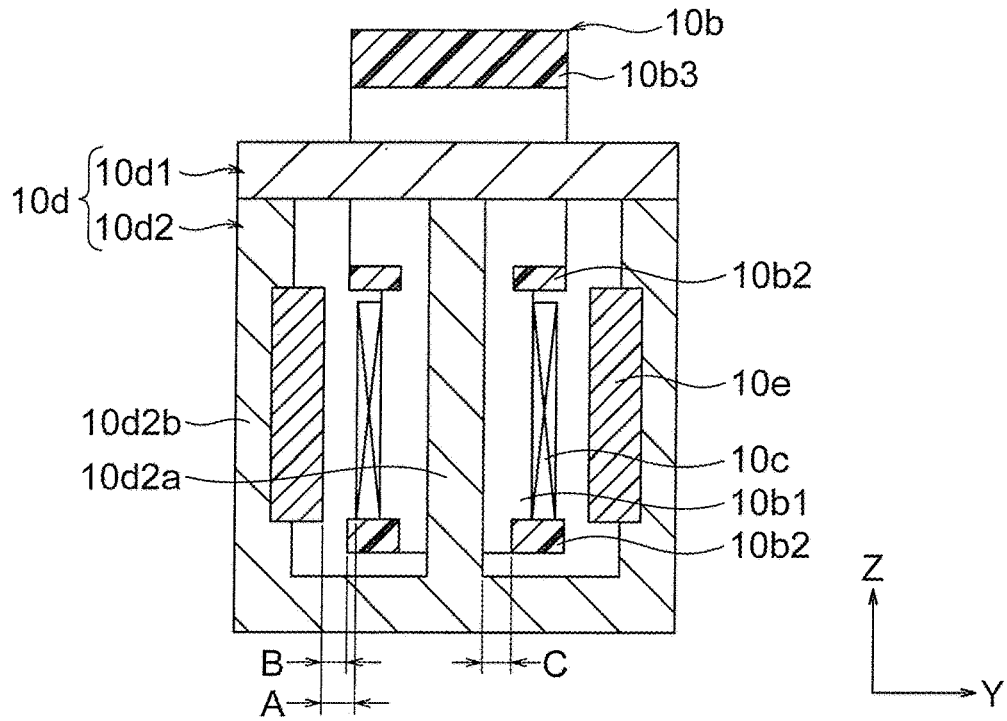
FIG. 5 is a sectional view taken along the line V-V of FIG. 2 as seen from the direction indicated by the arrows.
Figure 6:
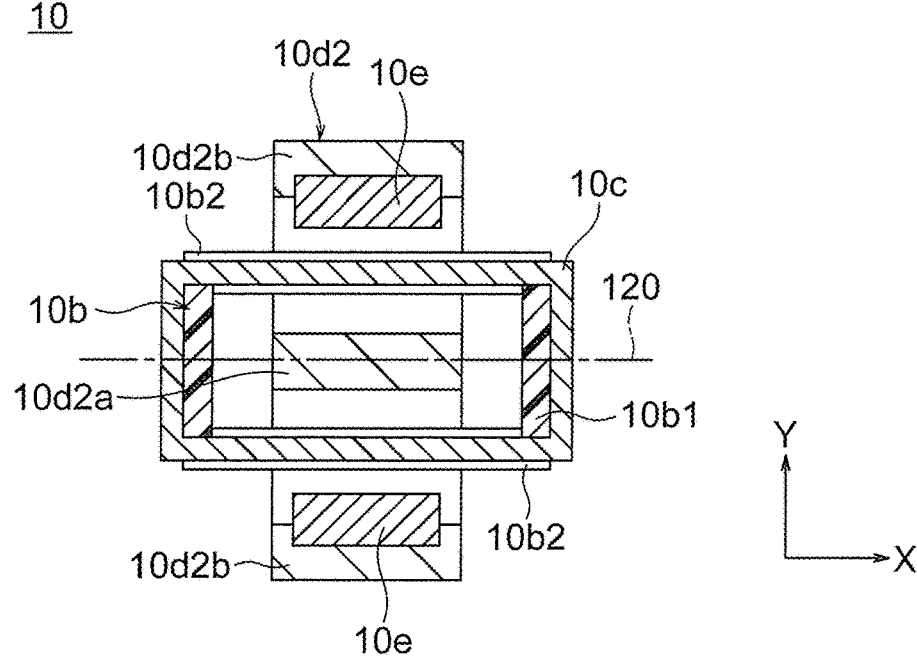
FIG. 6 is a sectional view taken along the line VI-VI of FIG. 2 as seen from the direction indicated by the arrows.

Next, details of the active guide roller 5 are described. Here, for convenience of description, the active guide roller 5 including the guide roller 9 in contact with a head portion 8a of the guide rail 8 from the X direction is described. FIG. 2 is a view for illustrating the active guide roller according to the first embodiment of the present invention as seen from the Y direction. FIG. 3 is a partial sectional view for illustrating the active guide roller according to the first embodiment of the present invention as seen from the X direction. FIG. 4 is an explanatory sectional view for illustrating a configuration of the active guide roller according to the first embodiment of the present invention. FIG. 5 is a sectional view taken along the line V-V of FIG. 2 as seen from the direction indicated by the arrows. FIG. 6 is a sectional view taken along the line VI-VI of FIG. 2 as seen from the direction indicated by the arrows. In FIG. 4, an illustration is given of cross sections taken along the X-Y plane passing through an axis of a rotation shaft and a center of a coil in the Z direction as seen from the Z direction in an overlapping manner.

In FIG. 2 to FIG. 4, a fixing member 6a is formed so as to extend upward in the Z direction from the support base 6 rigidly fixed to the car frame 2. The guide lever 7 is mounted to the fixing member 6a so as to be pivotable about a guide-lever support shaft 6b being a first shaft. Here, an axial direction of the guide-lever support shaft 6b corresponds to the Y direction, and an X-Z plane corresponds to a pivot plane 110 of the guide lever 7. The guide roller 9 is mounted to the guide lever 7 so as to be turnable about a roller support shaft 7a being a second shaft. An axial direction of the roller support shaft 7a corresponds to the Y direction. A spring member 7b is provided to the fixing member 6a. The guide lever 7 is turned by an urging force of the spring member 7b counterclockwise about the guide-lever support shaft 6b in FIG. 2. With this, the guide roller 9 is pressed against the head portion 8a of the guide rail 8.

The actuator 10 is fixed to the guide lever 7, and includes an arm 10a, a bobbin 10b, a coil 10c, a yoke 10d, and a pair of magnets 10e. The arm 10a extends in the X direction toward a side opposite to the guide rail 8. The bobbin 10b is fixed to a lower side of the arm 10a. The coil 10c is wound around the bobbin 10b. The yoke 10d is fixed to the support base 6. The pair of magnets 10e are fixed to the yoke 10d. The arm 10a, the bobbin 10b, and the coil 10c form a movable portion of the actuator 10 driven by pivoting of the guide lever 7. The yoke 10d and the pair of magnets 10e form a fixed portion of the actuator 10.

As illustrated in FIG. 5 and FIG. 6, the bobbin 10b is a resin formed body, and includes a winding barrel portion 10b1, a pair of flange portions 10b2, and a coupling portion 10b3. The winding barrel portion 10b1 is arranged apart in the X direction across a middle leg portion 10d2a. The pair of flange portions 10b2 extend in the X direction, and are configured to couple both end portions of the winding barrel portion 10b1 in the Z direction at both side portions in the Y direction. The coupling portion 10b3 is configured to couple the winding barrel portion 10b1 and the arm 10a to each other. The coil 10c is wound around the winding barrel portion 10b1 between the pair of flange portions 10b2, and has a rectangular tubular shape. The pair of flange portions 10b2 project in the Y direction as compared to an outer peripheral surface of the coil 10c.

The yoke 10d is formed of, for example, an I-shaped yoke 10d1 and an E-shaped yoke 10d2 to form a closed magnetic circuit. The I-shaped yoke 10d1 and the E-shaped yoke 10d2 are each made of a magnetic material such as ferrite. The middle leg portion 10d2a of the E-shaped yoke 10d2 is inserted into the winding barrel portion 10b1 from below. The I-shaped yoke 10d1 is arranged at the top of the E-shaped yoke 10d2 and is fixed to the E-shaped yoke 10d2. With this, the middle leg portion 10d2a and the side leg portions 10d2b of the E-shaped yoke 10d2 are brought into abutment against the I-shaped yoke 10d1, thereby forming the closed magnetic circuit. The pair of magnets 10e are fixed to surfaces of the pair of side leg portions 10d2b opposed to the middle leg portion 10d2a, respectively. With this, the pair of magnets 10e are separated apart from the middle leg portion 10d2a and arranged so as to be opposed to each other across the middle leg portion 10d2a. That is, the pair of magnets 10e are separated apart from the coil 10c and are arranged so as to be opposed to each other across the coil 10c. Moreover, the pair of magnets 10e are produced so as to be slightly longer than the coil 10c, and lower ends thereof are arranged so as to be located at positions slightly lower than a lower end of the coil 10c.

In the active guide roller 5 thus configured, as illustrated in FIG. 2 to FIG. 4, the pair of magnets 10e are arranged such that a magnetic field is generated in a direction perpendicular to the pivot plane 110 of the guide lever 7. The middle leg portion 10d2a and the winding barrel portion 10b1 of the bobbin 10b are coaxially arranged. That is, the coil 10c is arranged such that a center axis thereof is arranged in the direction perpendicular to the magnetic field of the pair of magnets 10e, that is, the Z direction. With the direction of the magnetic field set in the direction perpendicular to the pivot plane 110, the intensity of the magnetic field that passes through the coil 10c becomes constant at all the positions, thereby being capable of achieving stable control.

Here, the winding barrel portion 10b1 of the bobbin 10b and the middle leg portion 10d2a are coaxially arranged. A plane which passes through a coaxial position of the winding barrel portion 10b1 and the middle leg portion 10d2a and is parallel to the pivot plane 110 serves as a drive plane 120 of the actuator movable portion. The pair of magnets 10e are in plane symmetry with respect to the drive plane 120. A direction of the magnetic field generated by the pair of magnets 10e corresponds to a direction perpendicular to the drive plane 120.

Further, in the state in which the middle leg portion 10d2a of the yoke 10d and the winding barrel portion 10b1 of the bobbin 10b are coaxially arranged, when a minimum gap between the coil 10c and the magnet 10e in the Y direction is represented by A, a minimum gap between the flange portion 10b2 and the magnet 10e in the Y direction is represented by B, and a minimum gap between the middle leg portion 10d2a and the flange portion 10b2 in the Y direction is represented by C, the A, B, and C satisfy A>B and A>C. When the minimum gap between the flange portion 10b2 and the side leg portion 10d2b in the Y direction is smaller than the minimum gap between the flange portion 10b2 and the magnet 10e in the Y direction, a minimum gap between the flange portion 10b2 and the side leg portion 10d2b in the Y direction is represented by B.

Figure 7:
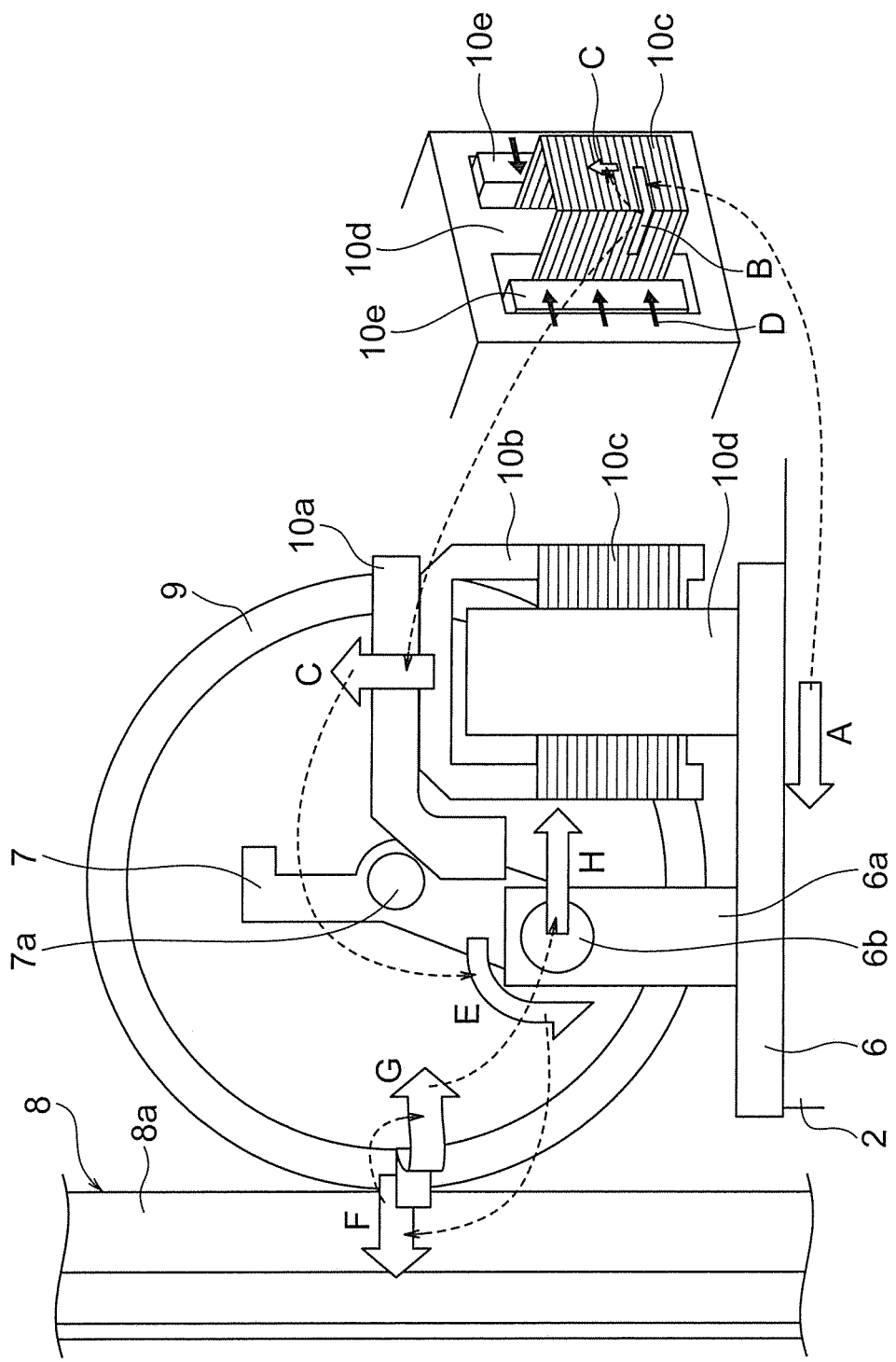
FIG. 7 is an explanatory schematic view for illustrating an operation of the active guide roller according to the first embodiment of the present invention.

Next, an operation of the active guide roller 5 is described with reference to FIG. 7. FIG. 7 is an explanatory schematic view for illustrating an operation of the active guide roller according to the first embodiment of the present invention.

First, at the time of going up and down, the car 100 is influenced by the displacement disturbance caused by, for example, a step or a bend of the guide rail 8 and vibrates. The sensor 11 mounted to the car frame 2 detects acceleration caused by the vibration of the car frame 2 as an acceleration signal and inputs the detected acceleration signal to a controller (not shown). The controller converts the input acceleration signal into an absolute speed. Here, when the absolute speed generated in the car frame 2 is an absolute speed in the direction indicated by the arrow A, the controller applies a current to flow through the coil 10c in the direction indicated by the arrow B. The coil 10c is arranged within the magnetic field generated from the magnets 10e in the direction indicated by the arrows D. Then, according to the Fleming's right-hand rule, the Lorenz force in the direction indicated by the arrow C is generated in the coil 10c.

The Lorenz force in the direction indicated by the arrow C is converted into torque in the direction indicated by the arrow E about the guide-lever support shaft 6b. Then, the guide lever 7 turns about the guide-lever support shaft 6b. With this, the guide roller 9 is pressed against the head portion 8a of the guide rail 8 in the direction indicated by the arrow F. At this time, the guide roller 9 receives a reaction force from the guide rail 8 in the direction indicated by the arrow G. This reaction force is transmitted to the guide-lever support shaft 6b via the guide roller 9 and the guide lever 7.

With this, a force in the direction indicated by the arrow H is generated in the guide-lever support shaft 6b, the support base 6, and the car frame 2.

As described above, the force in the direction H opposite to the direction indicated by the arrow A is generated in the car frame 2 with a magnitude which is proportional to the absolute speed in the direction indicated by the arrow A. With this, the car frame 2 exhibits behavior in a manner as if a damper is provided between the car frame 2 and an absolute space, and the vibration of the car frame 2 and the cage 1 is significantly reduced.

When the absolute speed in the direction opposite to the direction indicated by the arrow A is generated in the car frame 2, a current flows through the coil 10c in the direction opposite to the direction indicated by the arrow B.

Moreover, three active guide rollers 5 are mounted on each of end portion sides of the upper frame and the lower frame of the car frame 2 in the X direction, and are provided such that respective guide rollers 9 are brought into contact with the head portion 8a of the guide rail 8 from three directions, that is, from the X direction and from both sides in the Y direction. With this, at the time of going up and down, generation of the vibration of the car 100 due to the displacement disturbance caused by, for example, the step or the bend of the guide rail 8 is reliably suppressed, thereby suppressing occurrence of an event which gives a feeling of discomfort to a passenger.

Figure 8:
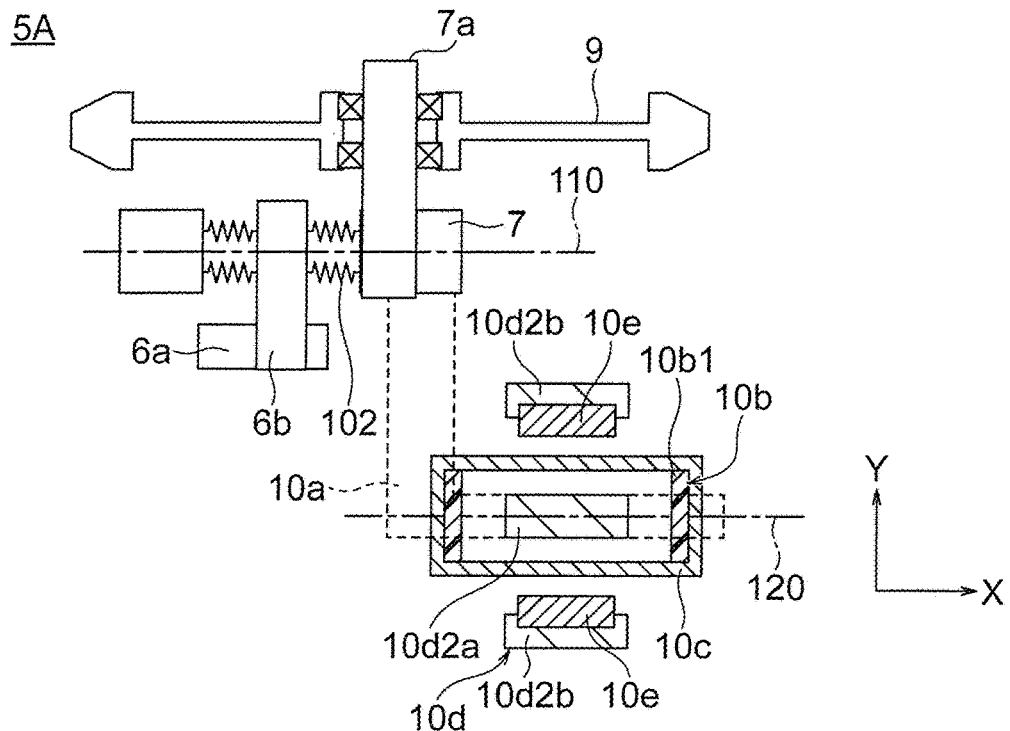
FIG. 8 is a sectional view for illustrating a non-operation state of an active guide roller of a comparative example.
Figure 9:
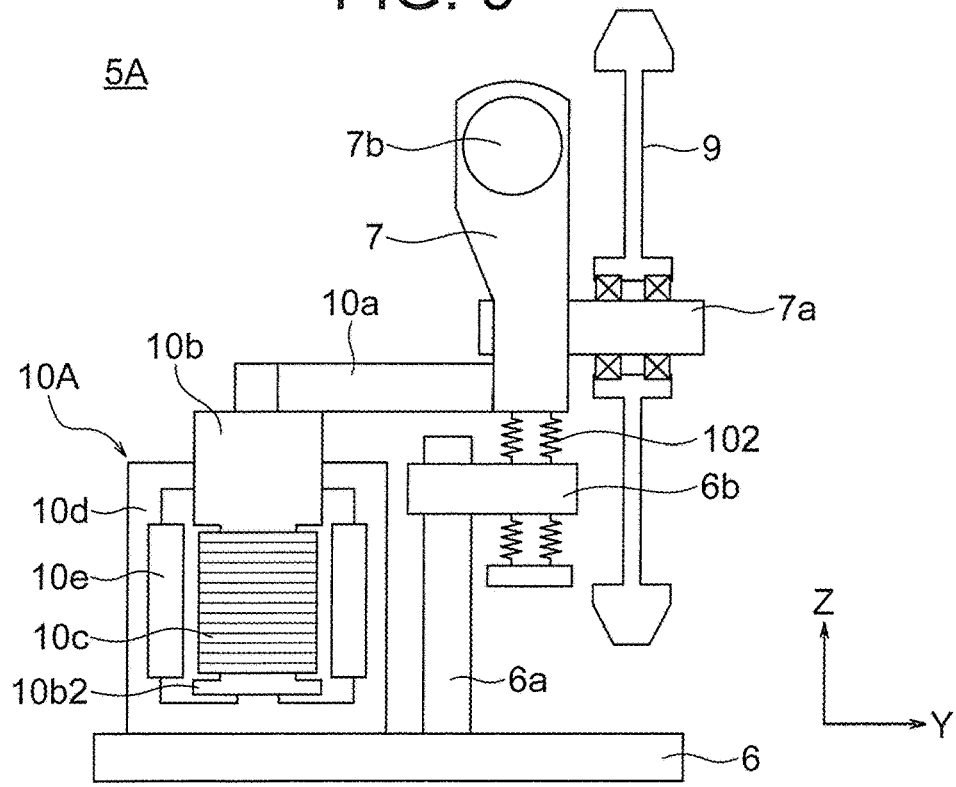
FIG. 9 is a partial sectional view for illustrating the non-operation state of the active roller of the comparative example as seen from the X direction.
Figure 10:
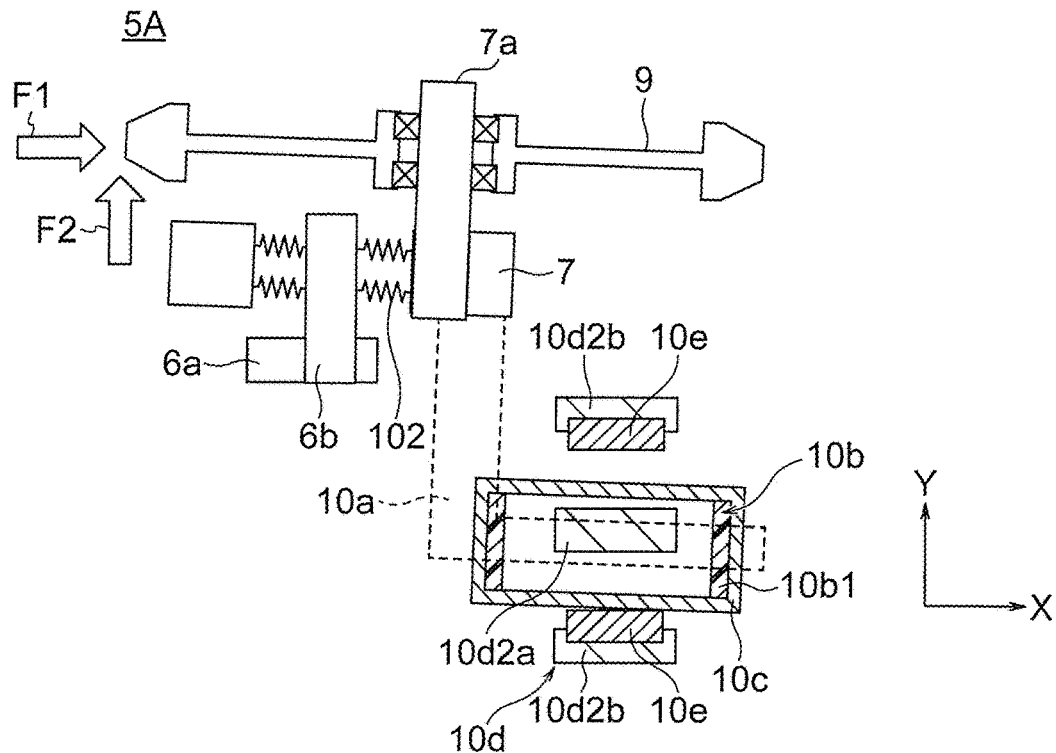
FIG. 10 is a sectional view for illustrating an operation state of the active guide roller of the comparative example.
Figure 11:
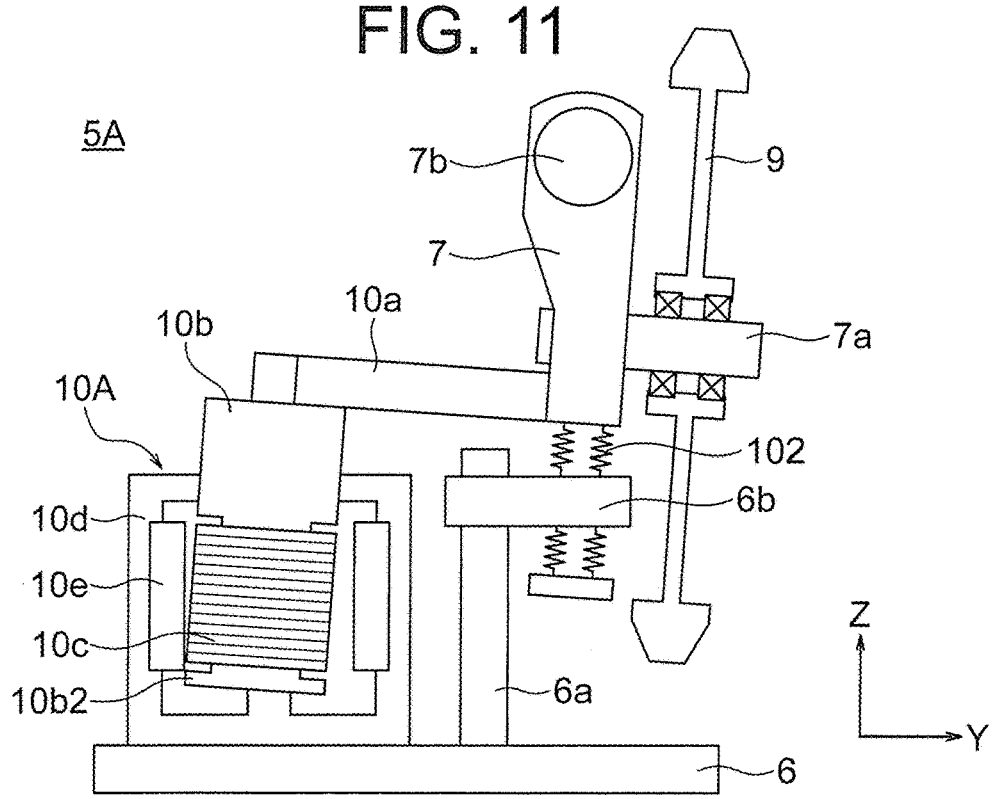
FIG. 11 is a partial sectional view for illustrating the operation state of the active guide roller of the comparative example as seen from the X direction.
Figure 12:
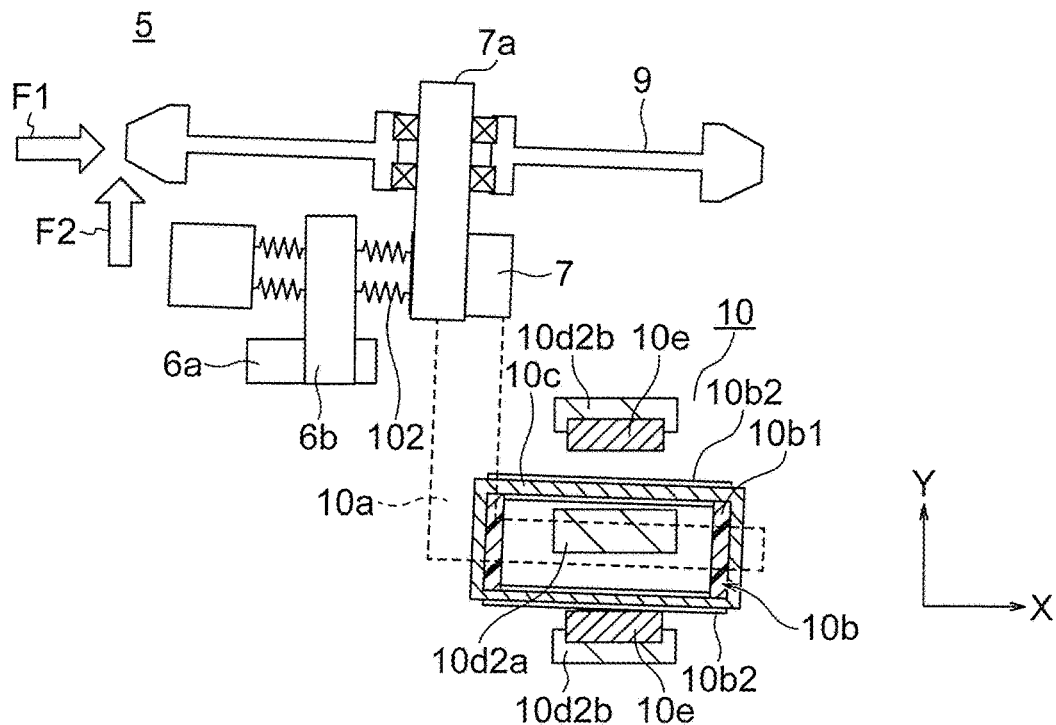
FIG. 12 is a sectional view for illustrating an operation state of the active guide roller according to the first embodiment of the present invention.
Figure 13:
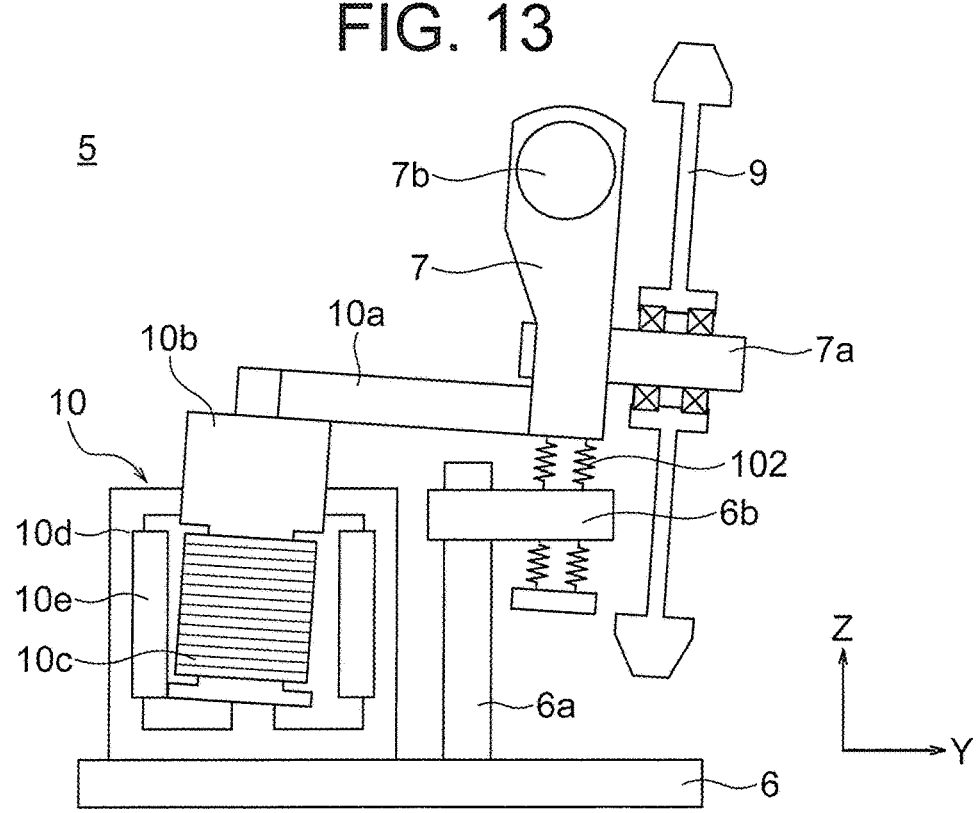
FIG. 13 is a sectional view for illustrating the operation state of the active guide roller according to the first embodiment of the present invention.

Next, consideration is given of the behavior of the active guide roller 5 when an unintended large external force is generated. FIG. 8 is a sectional view for illustrating a non-operation state of an active guide roller of a comparative example. FIG. 9 is a partial sectional view for illustrating the non-operation state of the active guide roller of the comparative example as seen from the X direction. FIG. 10 is a sectional view for illustrating an operation state of the active guide roller of the comparative example. FIG. 11 is a partial sectional view for illustrating the operation state of the active guide roller of the comparative example as seen from the X direction. FIG. 12 is a sectional view for illustrating an operation state of the active guide roller according to the first embodiment of the present invention. FIG. 13 is a sectional view for illustrating the operation state of the active guide roller according to the first embodiment of the present invention. FIG. 8, FIG. 10, and FIG. 12 are each a partial sectional view corresponding to FIG. 4. Moreover, in FIG. 8 to FIG. 13, a bearing configured to support a guide-lever supporting point is expressed as a spring element.

In an actuator 10A of an active guide roller 5A of the comparative example, as illustrated in FIG. 9, under a state in which the middle leg portion 10d2a of the yoke 10d and the winding barrel portion 10b1 of the bobbin 10b are coaxially arranged, an outer peripheral surface of the coil 10c slightly projects as compared to a protrusion surface of the flange portion 10b2 of the bobbin 10b. That is, when a gap between the coil 10c and the magnet 10e in the Y direction is represented by A, and a gap between the flange portion 10b2 and the magnet 10e in the Y direction is represented by B, the A and B satisfy A<B. As illustrated in FIG. 8, the pair of magnets 10e are in plane symmetry with respect to the drive plane 120 of the actuator movable portion. The coil 10c is separated apart from the magnets 10e and the side leg portions 10d2b in the direction perpendicular to the drive plane 120. Moreover, when a minimum gap between the middle leg portion 10d2a and the flange portion 10b2 in the Y direction is represented by C, the A and C satisfy A<C.

Here, as illustrated in FIG. 10, when the guide roller 9 receives an unintended large reaction force F1 or F2 from the guide rail 8, movement of an internal gap portion of a bearing 102 mounted to the guide-lever support shaft 6b occurs. As a result, the guide lever 7 is displaced so as to turn clockwise about the guide-lever support shaft 6b. Moreover, as illustrated in FIG. 11, the guide lever 7 is displaced so as to turn clockwise about the guide-lever support shaft 6b.

As described above, it can be understood that, with the configuration of the active guide roller 5A, the coil 10c is displaced in the Y direction when the guide roller 9 receives the unintended large reaction force F1 or F2 from the guide rail 8. Further, it can be understood that the displacement in the Y direction that occurs is the largest at the end portion of the coil 10c on the support base 6 side that is farthest from the guide-lever support shaft 6b, that is, at the lower end portion of the coil 10c. As a result, A<B and A<C are satisfied in the active guide roller 5A, and hence, as illustrated in FIG. 10 and FIG. 11, the lower end portion of the coil 10c is brought into contact with the magnet 10e, causing a damage on the coil 10c.

In the first embodiment, the actuator 10 of the active guide roller 5 satisfies A>B. Thus, as illustrated in FIG. 12 and FIG. 13, before the lower end portion of the coil 10c is brought into contact with the magnet 10e, the flange portion 10b2 on the lower side of the winding barrel portion 10b1 is brought into contact with the magnet 10e. With this, the contact between the coil 10c and the magnet 10e is prevented, thereby being capable of suppressing the damage on the coil 10c. Here, before the lower end portion of the coil 10c is brought into contact with the magnet 10e, the flange portion 10b2 on the lower side of the winding barrel portion 10b1 is brought into contact with the magnet 10e. However, the flange portion 10b2 may be brought into contact with the side leg portion 10d2b. The flange portion 10b2 on the lower side of the winding barrel portion 10b1 forms a coil contact preventing member.

Moreover, the actuator 10 of the active guide roller 5 may satisfy A>C. In this case, before the lower end portion of the coil 10c is brought into contact with the magnet 10e, a lower end portion of an inner peripheral wall surface of the flange portion 10b2 of the bobbin 10b is brought into contact with the middle leg portion 10d2a. In this case, the lower ends of the pair of magnets 10e are not required to be arranged at positions lower than the lower end of the coil 10c, and may be arranged at positions higher than the lower end of the coil 10c. As described above, when the actuator 10 of the active guide roller 5 satisfies A>B or A>C, the contact between the coil 10c and the magnet 10e is prevented, thereby being capable of suppressing the damage on the coil 10c.

Thus, it is not required to set the gap between the coil 10c and the magnet 10e to be large in order to avoid the contact between the coil 10c and the magnet 10e. Therefore, the Lorenz force, that is, the thrust force of the actuator 10 can be secured without setting the size of the actuator 10 to be large, thereby achieving downsizing of the active guide roller 5.

Here, in the first embodiment described above, description is made of the case in which the guide roller 9 receives the external force F1 or F2 so that the coil 10c is displaced so as to turn about the guide-lever support shaft 6b. However, there is also a case in which the center axis of the coil 10c is maintained in the Z direction so that the coil 10c is displaced in parallel in the Y direction. Even in such a case, with the configuration of the first embodiment, before the coil 10c is brought into contact with the magnet 10e, the flange portion 10db2 is brought into contact with the magnet 10e or the middle leg portion 10d2a, thereby suppressing breakage of the coil 10c.

In the first embodiment described above, on each of end portion sides of the upper frame and the lower frame of the car frame 2 in the X direction, three active guide rollers 5 are provided such that respective guide rollers 9 are brought into contact with the head portion 8a of the guide rail 8 from three directions, that is, from the X direction and from both sides in the Y direction. However, the number of the active guide rollers 5 and a mode of installation thereof are not limited to those described above.

Moreover, in the first embodiment described above, the pair of magnets 10e are arranged such that the magnetic field is generated in the direction perpendicular to the pivot plane 110 of the guide lever 7. However, the direction of the magnetic field generated by the pair of magnets 10e is not always required to be the direction perpendicular to the pivot plane, and it is only required that the direction of the magnetic field intersect the pivot plane 110.

Moreover, in the first embodiment described above, the bobbin 10b is made of a resin. However, a material of the bobbin 10b is not limited to the resin, and it is only required that the material be a non-magnetic material. For example, the bobbin 10b may be made of aluminum.

Moreover, in the first embodiment described above, the flange portion 10b2 on the lower end side of the winding barrel portion 10b1 serves as the coil contact preventing member. However, a protrusion portion may be formed on the outer peripheral surface of the flange portion 10b2, and the protrusion portion may project from the outer peripheral surface of the coil 10c to serve as the coil contact preventing member.

Moreover, in the first embodiment described above, description is made of the case in which the guide lever 7 is pivotably mounted to the guide-lever support shaft 6b projecting from the fixing member 6a toward one side in the Y direction, that is, the case in which the guide-lever support shaft 6b configured to pivotably support the guide lever 7 is supported by the fixing member 6a in a cantilever state. However, the same problem arises in the case in which the guide lever 7 is pivotably mounted to the guide-lever support shaft 6b projecting from the fixing member 6a toward both sides in the Y direction, that is, the case in which the guide-lever support shaft 6b configured to pivotably support the guide lever 7 is supported by the fixing member 6a in a centered state. In view of the above, when the present invention is applied to the case in which the guide-lever support shaft 6b configured to pivotably support the guide lever 7 is supported by the fixing member 6a in the centered state, the damage on the coil 10c caused by the contact with the magnet 10e can be suppressed.

Moreover, in the first embodiment described above, the bobbin 10b and the coil 10c form the movable portion of the actuator 10 driven by the pivoting of the guide lever 7, and the yoke 10d and the pair of magnets 10e form the fixed portion of the actuator 10. However, the yoke 10d and the pair of magnets 10e may form the movable portion of the actuator 10 driven by the pivoting of the guide lever 7, and the bobbin 10b and the coil 10c may form the fixed portion of the actuator 10.

REFERENCE SIGNS LIST 5 active guide roller, 6b guide-lever support shaft (first shaft), 7 guide lever, 7a roller support shaft (second shaft), 7b spring member, 8 guide rail, 9 guide roller, 10 actuator, 10b bobbin (actuator movable portion), 10b1 winding barrel portion, 10b2 flange portion (coil contact preventing member), 10c coil (actuator movable portion), 10d yoke (actuator fixed portion), 10d2a middle leg portion, 10d2b side leg portion, 10e magnet (actuator fixed portion), 100 car, 101 hoistway, 110 pivot plane

The invention claimed is:

1. An active guide roller, comprising:
   a guide lever, which is provided to a car provided in a hoistway and configured to go up and down along a guide rail extending in an up-and-down direction, and is provided so as to be pivotable about a first shaft orthogonal to the up-and-down direction;
   a guide roller provided to the guide lever so as to be turnable about a second shaft parallel to the first shaft;
   a spring member configured to urge the guide roller into contact with the guide rail; and
   an actuator including:
      an actuator fixed portion to be fixed to the car; and
      an actuator movable portion configured to be driven by pivoting of the guide lever,
   wherein one of the actuator movable portion and the actuator fixed portion includes:
      a yoke, which includes a middle leg portion and a pair of side leg portions arranged so as to be opposed to each other across the middle leg portion, and forms a closed magnetic circuit; and
      a pair of magnets, which are provided on respective surfaces of the pair of side leg portions opposed to the middle leg portion, and are configured to generate a magnetic field intersecting a pivot plane of the guide lever orthogonal to the first shaft,
   wherein another one of the actuator movable portion and the actuator fixed portion includes:
      a bobbin including a winding barrel portion into which the middle leg portion is inserted; and
      a coil, which is wound around the winding barrel portion, and is arranged within the magnetic field,
   wherein the active guide roller is configured to suppress vibration of the car with use of a Lorenz force generated by application of a current through the coil,
   wherein the actuator is configured to avoid contact between the coil and the magnet by allowing the bobbin and the magnet to be brought into contact with each other or allowing the bobbin and the yoke to be brought into contact with each other when the actuator movable portion is displaced in a direction perpendicular to the pivot plane, and
   wherein, in a state in which the winding barrel portion and the middle leg portion are coaxially arranged, when a minimum gap between the coil and the magnet in the direction perpendicular to the pivot plane is represented by A, and a minimum gap between the winding barrel portion and the middle leg portion in the direction perpendicular to the pivot plane is represented by C, the A and C satisfy A>C.

2. The active guide roller according to claim 1,
   wherein the bobbin includes a coil contact preventing member configured to be brought into contact with the magnet or the yoke when the actuator movable portion is displaced in the direction perpendicular to the pivot plane, and
   wherein, in a state in which the winding barrel portion and the middle leg portion are coaxially arranged, when a minimum gap between the coil and the magnet in the direction perpendicular to the pivot plane is represented by A, and a smaller one of a minimum gap between the coil contact preventing member and the side leg portion and a minimum gap between the coil contact preventing member and the magnet in the direction perpendicular to the pivot plane is represented by B, the A and B satisfy A>B.

3. The active guide roller according to claim 2, wherein the coil contact preventing member comprises a flange portion which projects from an end portion of the winding barrel portion toward the side leg portion.

4. An elevator device, comprising:
a car provided in a hoistway and configured to go up and down along a guide rail extending in an up-and-down direction;
a guide lever provided to the car so as to be pivotable about a first shaft orthogonal to the up-and-down direction;
a guide roller provided to the guide lever so as to be turnable about a second shaft parallel to the first shaft;
a spring member configured to urge the guide roller into contact with the guide rail; and
an actuator including:
  an actuator fixed portion to be fixed to the car; and
  an actuator movable portion configured to be driven by pivoting of the guide lever,
wherein one of the actuator movable portion and the actuator fixed portion includes:
  a yoke, which includes a middle leg portion and a pair of side leg portions arranged so as to be opposed to each other across the middle leg portion, and forms a closed magnetic circuit; and
  a pair of magnets, which are provided on respective surfaces of the pair of side leg portions opposed to the middle leg portion, and are configured to generate a magnetic field intersecting a pivot plane of the guide lever orthogonal to the first shaft,
wherein another one of the actuator movable portion and the actuator fixed portion includes:
  a bobbin including a winding barrel portion into which the middle leg portion is inserted; and
  a coil, which is wound around the winding barrel portion, and is arranged within the magnetic field,
wherein the elevator device is configured to suppress vibration of the car with use of a Lorenz force generated by application of a current through the coil,
wherein the actuator is configured to avoid contact between the coil and the magnet by allowing the bobbin and the magnet to be brought into contact with each other or allowing the bobbin and the yoke to be brought into contact with each other when the actuator movable portion is displaced in a direction perpendicular to the pivot plane, and
wherein, in a state in which the winding barrel portion and the middle leg portion are coaxially arranged, when a minimum gap between the coil and the magnet in the direction perpendicular to the pivot plane is represented by A, and a minimum gap between the winding barrel portion and the middle leg portion in the direction perpendicular to the pivot plane is represented by C, the A and C satisfy A>C.

5. The elevator device according to claim 4,
wherein the bobbin includes a coil contact preventing member configured to be brought into contact with the magnet or the yoke when the actuator movable portion is displaced in the direction perpendicular to the pivot plane, and
wherein, in a state in which the winding barrel portion and the middle leg portion are coaxially arranged, when a minimum gap between the coil and the magnet in the direction perpendicular to the pivot plane is represented by A, and a smaller one of a minimum gap between the coil contact preventing member and the side leg portion and a minimum gap between the coil contact preventing member and the magnet in the direction perpendicular to the pivot plane is represented by B, the A and B satisfy A>B.

6. The elevator device according to claim 5, wherein the coil contact preventing member comprises a flange portion which projects from an end portion of the winding barrel portion toward the side leg portion.

* * * * *